H. T. WHIDDEN.
HARROW.
APPLICATION FILED JULY 15, 1918.

1,285,514.

Patented Nov. 19, 1918.
2 SHEETS—SHEET 1.

Witnesses
James F. Crown
A. P. Hollingsworth

Inventor
Heenan T. Whidden,
By Richard B. Owen,
Attorney

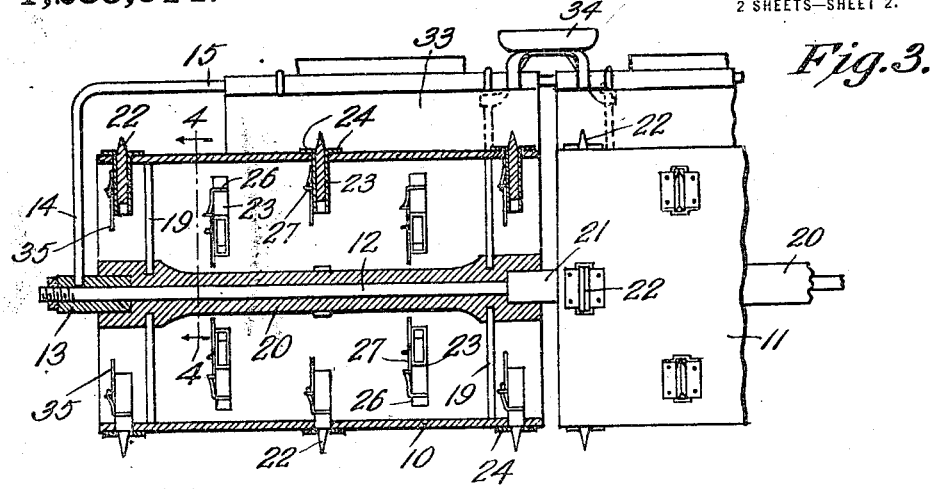

UNITED STATES PATENT OFFICE.

HEENAN T. WHIDDEN, OF LABELLE, FLORIDA.

HARROW.

1,285,514.        Specification of Letters Patent.        Patented Nov. 19, 1918.

Application filed July 15, 1918. Serial No. 244,964.

*To all whom it may concern:*

Be it known that I, HEENAN T. WHIDDEN, a citizen of the United States, residing at Labelle, in the county of Lee and State of Florida, have invented certain new and useful Improvements in Harrows, of which the following is a specification.

This invention relates to harrows and particularly to revolving harrows of that type in which teeth for breaking clods of earth are mounted upon the periphery of one or more rollers, which travel over the ground and roll the surface thereof simultaneously with the action of the teeth in breaking the clods.

Another object of the invention is to provide a harrow of this type with teeth which are radially adjustable in the roller and are thus adapted to be projected a greater or lesser distance beyond the periphery of the roller as warranted by the condition of the ground or may be wholly depressed below the surface when it is desired to use the roller independently of the teeth.

With these objects in view, together with others which will appear as the description proceeds, the invention resides in the novel formation, combination and arrangement of parts, all as will be described more fully hereinafter, particularly pointed out in the claims, and illustrated in the accompanying drawings, in which:

Fig. 3 is a rear view, enlarged of a portion of the harrow provided with two rollers, one of the rollers being shown in vertical section.

Fig. 4 is a cross sectional view of one of the rollers on the line 4—4 of Fig. 3, Fig. 5 is a detail perspective view of one of the sleeves which hold the teeth.

Fig. 6 is a perspective view of one of the teeth separated from the harrow, and

Fig. 7 is a plan view of a portion of one of the rollers showing a modified arrangement of teeth.

Figure 1:
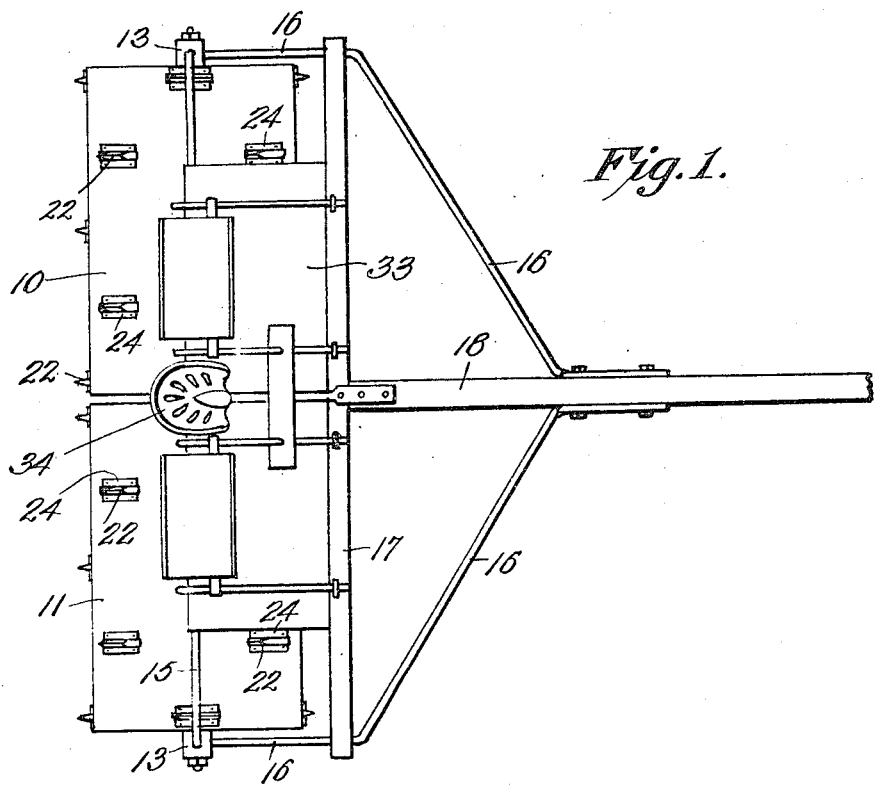
Figure 1 is a top plan view of the improved harrow.

In the drawings, 10 and 11 represent two rollers arranged in axial alinement and rotatably mounted upon a rod 12 which forms a shaft for said rollers. The shaft or axle 12 is supported at each end by a sleeve 13 to which sleeves the ends 14 of a U-shaped bar 15 are connected. The bar 15 extends longitudinally over the top of the rollers 10 and 11 and thence downwardly by means of the ends 14 to the sleeves 13. Projecting forwardly in a substantially horizontal direction from each sleeve is a rod 16, said rods being connected by a bar 17 a short distance in front of the rollers. Secured to the bar 17 is a tongue 18 to which the rods 16 are bolted, these rods being bent at an angle toward the tongue after passing through the bar 17.

Figure 2:
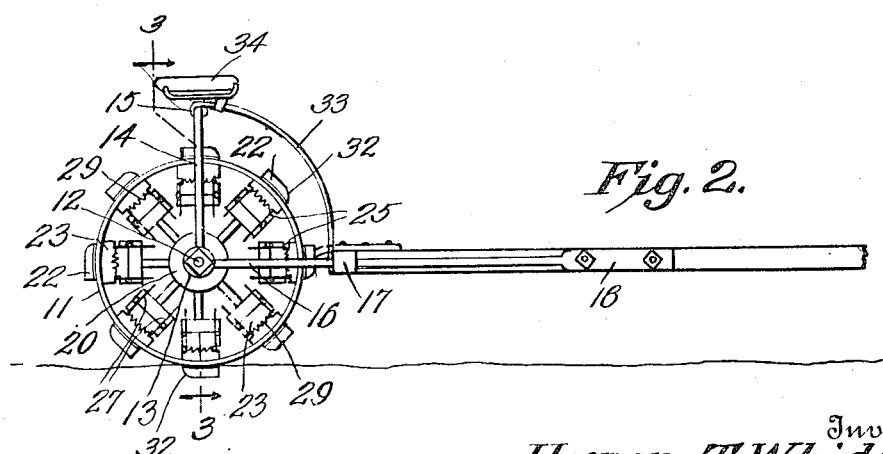
Fig. 2 is a side elevation of the same.

Each roller 10 is formed of plate metal bent into cylindrical form and mounted by spokes 19 upon a hub 20, through which the shaft or axle 12 passes. Between the inner adjacent ends of the roller is a sleeve 21, the ends of which are fitted in depressions in the inner ends of the hubs and serve to limit the distance between the rolls. Carried by each roll 10 and 11 are a plurality of radially projecting teeth 22 arranged in circumferential rows, the teeth of one row being offset or staggered from those of the row on each side for the purpose of obtaining the best results. These teeth, of which four are shown in each row although the number may be increased, are each carried by a sleeve 23 that extends radially through an opening in the surface of the roll and is riveted thereto by laterally extending flanges on the outer end of the sleeve, as at 24. Between the ends of each sleeve the narrow sides thereof are notched as at 25 to receive the gripping ends 26 of two locking members 27 pivoted at 28 to the sleeve and held in operative engagement by a spring 29. The teeth 22 are each formed, as shown in detail in Fig. 6, with a series of notches 30 on the narrow edges to be engaged by the gripping ends 26 of the locking members and hold the tooth in its projected position as in Fig. 4 or wholly within the sleeve as circumstances call for. The outer end of each tooth is tapered as at 31 with the forward corner rounded in the manner shown at 32. The teeth 22 are preferably arranged with their narrow side in the direction of rotation of the harrow, as shown in Figs. 1 to 4, but if desired, they may be turned with their flat sides facing the direction of movement as in Fig. 7.

Preferably a shield 33 is attached to the U-frame 15 and from thence curved downwardly and forwardly over the front of the rolls 10 and 11 to the bar 17 to which it is attached. By this means protection is afforded for the person driving the harrow who will sit upon the seat 34 attached to the U-frame 15.

The operation of the harrow is clear from an inspection of the drawings, it being only necessary to mention that when the teeth 22 are to be projected from or lowered into the sleeve 23, the only requirement is to press together the lower ends 35 of the locking members 27, whereupon the gripping ends 26 will be withdrawn from the notches in the teeth and the latter may be withdrawn or lowered as desired.

The foregoing description and the drawings have reference to what may be considered the preferred, or approved form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent, is:

1. In a harrow, the combination of a hollow roller and means for drawing it over the ground, a plurality of radially disposed sleeves connected to the periphery of said roller and extending inwardly therefrom, a tooth slidable in each sleeve, and locking means on each sleeve to hold the tooth adjustably positioned therein.

2. In a harrow, the combination of a roller and means for drawing it over the ground, a plurality of radially adjustable teeth arranged in circumferential rows on the roller to be projected through the periphery thereof, and an individual spring actuated locking means engageable with notches in each tooth for holding said tooth fixed at the desired degree of projection.

3. In a harrow, the combination of a hollow roller and means for drawing it over the ground, a plurality of radially disposed sleeves connected to the periphery of said roller and extending inwardly therefrom, a notch being formed in each of two sides of each sleeve, a tooth slidable in each sleeve, and provided on opposite edges with a plurality of notches coöperable with the notches in the sleeve, and a spring actuated locking means on each sleeve adapted to enter said notches and hold the tooth in adjusted position.

4. In a harrow, the combination of a pair of alined rollers, an axle upon which said rollers are mounted and about which they revolve, a frame supporting said axle and provided with means for drawing the rollers over the ground, a plurality of radially disposed sleeves connected to the periphery of each roller and extending inwardly therefrom, said sleeves being arranged in circumferential rows on each roller, the sleeves of one row being offset from those of the rows on each side thereof, a pair of spring actuated locking members mounted on each sleeve, and a tooth slidable in each sleeve to be projected beyond the periphery of the roller or retracted wholly within the surface thereof, and adapted to be locked in adjusted position by said locking members.

5. In a harrow, the combination of a pair of alined rollers, an axle for said rollers, a frame for supporting said axle and provided with means for drawing the rollers over the ground, a plurality of sleeves radially disposed around each roller and connected to the periphery thereof, a pair of spring actuated locking members pivoted on each sleeve and each having a gripping end arranged to enter a notch in the side of the sleeve, and a tooth adjustable in each sleeve having spaced notches in opposite sides coördinating with the notches in the sleeve, and adapted to be engaged by said locking members to hold the tooth in adjusted position.

In testimony whereof I affix my signature in presence of two witnesses.

HEENAN T. WHIDDEN.

Witnesses:
J. R. DOTY,
JACK RIDGDILL.

Copies of this patent may be obtained for five cents each, by addressing the "Commissioner of Patents, Washington, D. C."